United States Patent [19]

Matsumoto

[11] Patent Number: 5,645,779
[45] Date of Patent: Jul. 8, 1997

[54] MOLDING PART OF THERMOPLASTIC RESIN AND METHOD OF FABRICATING SAME

[75] Inventor: Koichi Matsumoto, Yokkaichi, Japan

[73] Assignee: Sumitomo Wiring Systems, Ltd., Japan

[21] Appl. No.: 415,772

[22] Filed: Apr. 3, 1995

Related U.S. Application Data

[63] Continuation of Ser. No. 208,539, Mar. 9, 1994, abandoned.

[30] Foreign Application Priority Data

Mar. 15, 1993 [JP] Japan ..................... 5-081262

[51] Int. Cl.[6] ..................... B29D 9/00
[52] U.S. Cl. ..................... 264/45.5; 264/45.7; 264/46.5; 264/528; 264/529; 264/DIG. 14
[58] Field of Search ..................... 264/45.7, 517, 264/520, 528, 529, 538, 45.5, 46.5, DIG. 14

[56] References Cited

U.S. PATENT DOCUMENTS

| | | | |
|---|---|---|---|
| 3,211,605 | 10/1965 | Spaak et al. | 264/321 |
| 3,384,691 | 5/1968 | Weissman et al. | 264/45.5 |
| 3,767,742 | 10/1973 | Robin | 428/318.8 X |
| 3,958,053 | 5/1976 | Ryan | 428/318.8 X |
| 3,962,390 | 6/1976 | Mori et al. | 428/318.8 X |
| 4,129,635 | 12/1978 | Yasuike et al. | 264/45.5 |
| 4,157,413 | 6/1979 | Ruhl | 428/159 |
| 4,808,450 | 2/1989 | Guy | 428/318.6 |

FOREIGN PATENT DOCUMENTS

| | | | |
|---|---|---|---|
| 786847 | 11/1972 | Belgium . | |
| 2377269 | 8/1978 | France | B29D 27/00 |
| 2380121 | 9/1979 | France | B29F 1/022 |
| 2755850 | 6/1979 | Germany | B29D 27/00 |
| 118466 | 10/1978 | Japan | B29D 27/00 |

OTHER PUBLICATIONS

Database WPI, Section CH, Week 8023, Class A32, AN 80-40795C ; JPA 55-057,439; Apr. 29, 1980.

*Primary Examiner*—Marion E. McCamish
*Assistant Examiner*—Blaine R. Copenheaver
*Attorney, Agent, or Firm*—Bierman and Muserlian

[57] ABSTRACT

A protector made of thermoplastic resin to which a foaming agent is added is adapted such that no foams are present in the thermoplastic resin forming a predetermined volume area including lock portions mounted on a protector body for integrating the protector body and a lid element but foams are present in the thermoplastic resin forming the area other than the predetermined volume area, whereby a molded part of thermoplastic resin is provided which accomplishes weight reduction and an insured strength at a strength-required area.

2 Claims, 10 Drawing Sheets

FIG. 8B ced thermoplastic resin from the injection gate into a cavity in a
MOLDING PART OF THERMOPLASTIC RESIN AND METHOD OF FABRICATING SAME This application is a continuation of application Ser. No. 08/208,539, filed Mar. 9, 1994, now abandoned.

BACKGROUND OF THE INVENTION

1. Field of the Invention

The present invention relates to a molded part made of foamed thermoplastic resin employed as a protector or the like for an automotive wire harness and a method of fabricating the same.

2. Description of the Prior Art

Figure 8A:
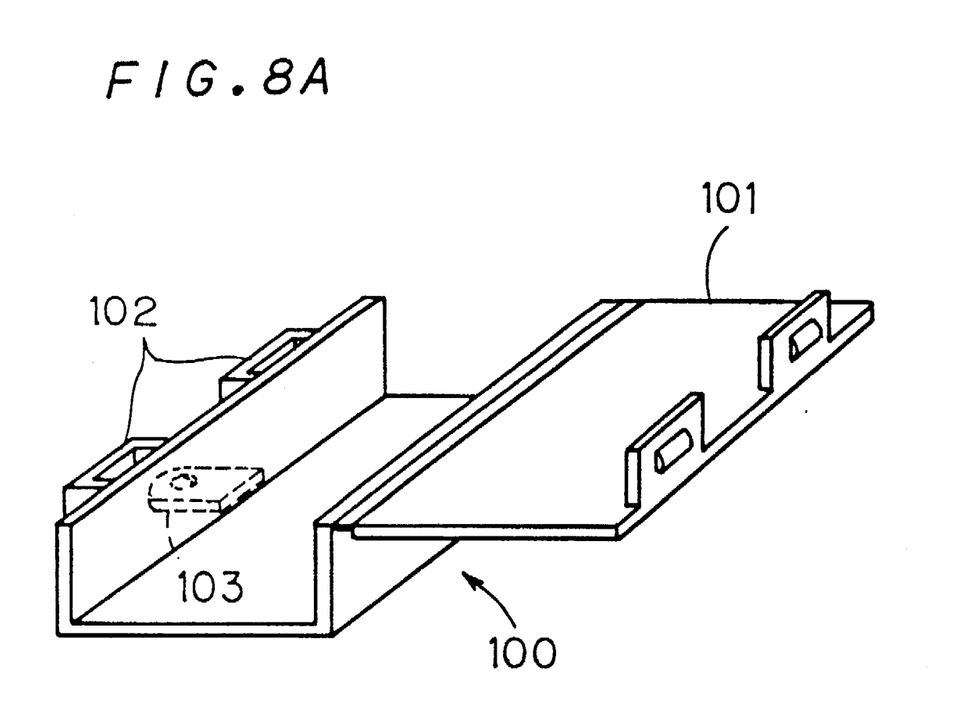
FIGS. 8A and 8B illustrate a conventional protector for a vehicular harness.
Figure 8B:
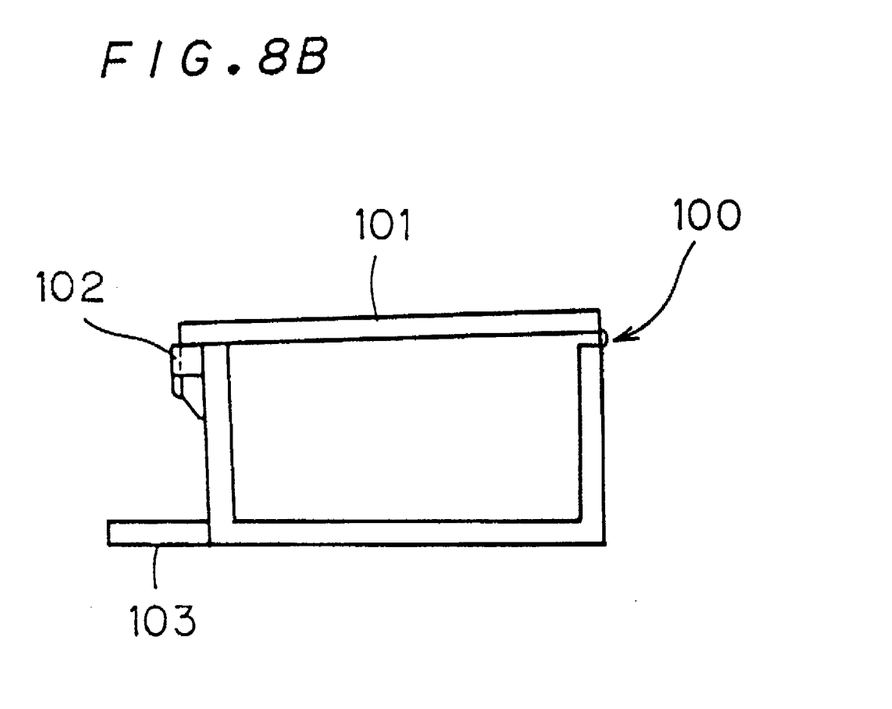

A wire harness for wiring in an automotive electric system is protected by a protector 100 shaped as shown in FIGS. 8A and 8B, for example, which has an opening and closing lid 101 on one side surface thereof so as not to be damaged by a flash formed by punching in a press molded vehicular body. Such a protector 100 includes lock portions 102 for fixing the opening and closing lid 101 in a closed state after the wire harness is housed in the protector 100, and a bolting portion 103 for fixing the protector 100 to the vehicular body.

There has been a need for weight reduction of automotive vehicles for various reasons, and the protector 100 is no exception. In general, the above-mentioned protector 100 is fabricated by injection molding using thermoplastic resin such as polypropylene. One of the approaches to reduce the weight of a molded part of thermoplastic resin is to foam the molded part. Such a foamed molded part is achieved by adding a foaming agent to thermoplastic resin, plasticizing the thermoplastic resin, and injecting the plasticized thermoplastic resin into a mold.

Although required to be reduced in weight, the protector 100 shown in FIGS. 8A and 8B includes local areas required to have a strength higher than that of the other areas, such as the lock portions 102 and bolting portion 103. However, when the molded part of resin is foam molded in the conventional manner such as the protector 100, foams are present in the resin forming the lock portions 102 and the bolting portion 103, resulting in an insufficient strength of the lock portions 102 and the bolting portion 103.

SUMMARY OF THE INVENTION

The present invention is intended for an injection molded part made of thermoplastic resin to which a foaming agent is added. According to the present invention, the molded part comprises: a predetermined selected area formed of the thermoplastic resin containing no foams; and a non-selected area formed of the thermoplastic resin containing a group of foams dispersed generally uniformly therein.

According to the molded part of thermoplastic resin, the presence of foams in the thermoplastic resin forming the area other than the selected area allows the reduction in weight of the area other than the selected area. The absence of foams in the thermoplastic resin forming the selected area prevents the strength of the selected area from lowering.

The molded part of thermoplastic resin according to the present invention ensures the strength of the required area as well as providing weight reduction.

The present invention is also intended for a method of fabricating a molded part of thermoplastic resin. According to the present invention, the method comprises the steps of: feeding a thermoplastic resin material and a foaming agent into a cylinder of an injection molding machine having a nozzle communicating with an injection gate; rotating a screw disposed in the cylinder at a predetermined rotational speed to knead and plasticize the thermoplastic resin and the foaming agent in the cylinder; injecting the plasticized thermoplastic rein from the injection gate into a cavity in a mold; and cooling the thermoplastic resin in the cavity and then removing the molded part of thermoplastic resin from the mold, the injection gate being coupled to a portion of the cavity corresponding to a strength-required area of the molded part of thermoplastic resin, the rotational speed of the screw being controlled such that the thermoplastic resin injected into the cavity is rendered unfoamed only in a region corresponding to the volume of the strength-required area at an outlet of the injection gate.

In the method, as the rotational speed of the screw increases when the thermoplastic resin is plasticized, the volume of the unfoamed portion at the outlet of the injection gate increases. By injecting the thermoplastic resin into the cavity from the injection gate coupled to the portion corresponding to the strength-required area of the molded part, with the rotational speed of the screw adjusted to a predetermined speed, the unfoamed portion having a volume corresponding to the volume of the strength-required area is formed only at the outlet of the injection gate.

According to another aspect of the present invention, the method comprises the steps of: feeding a thermoplastic resin material and a foaming agent into a cylinder of an injection molding machine having a nozzle communicating with an injection gate; rotating a screw disposed in the cylinder, with a predetermined back pressure applied to the screw, to knead and plasticize the thermoplastic resin and the foaming agent in the cylinder; injecting the plasticized thermoplastic resin from the injection gate into a cavity of a mold; and cooling the thermoplastic resin in the cavity and then removing the molded part of thermoplastic resin from the mold, the injection gate being coupled to a portion of the cavity corresponding to a strength-required area of the molded part of thermoplastic resin, the back pressure being controlled such that the thermoplastic resin injected into the cavity is rendered unfoamed in a region corresponding to the volume of the strength-required area at an outlet of the injection gate.

In this method, as the back pressure applied to the screw increases when the thermoplastic resin is plasticized, the volume of the unfoamed portion at the outlet of the injection gate increases. By injecting the thermoplastic resin into the cavity from the injection gate coupled to the portion corresponding to the strength-required area of the molded part, with the back pressure adjusted to a predetermined pressure, the unfoamed portion having a volume corresponding to the volume of the strength-required area is formed only at the outlet of the injection gate.

The foregoing aspects of the method of the present invention provide the molded part fabricated such that foams are absent in the thermoplastic resin forming the strength-required area but foams are present in the thermoplastic resin forming the other area.

An object of the present invention is to provide a molded part of thermoplastic resin which is light-weight and has an increased strength in a required portion, and a method of fabricating the same.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
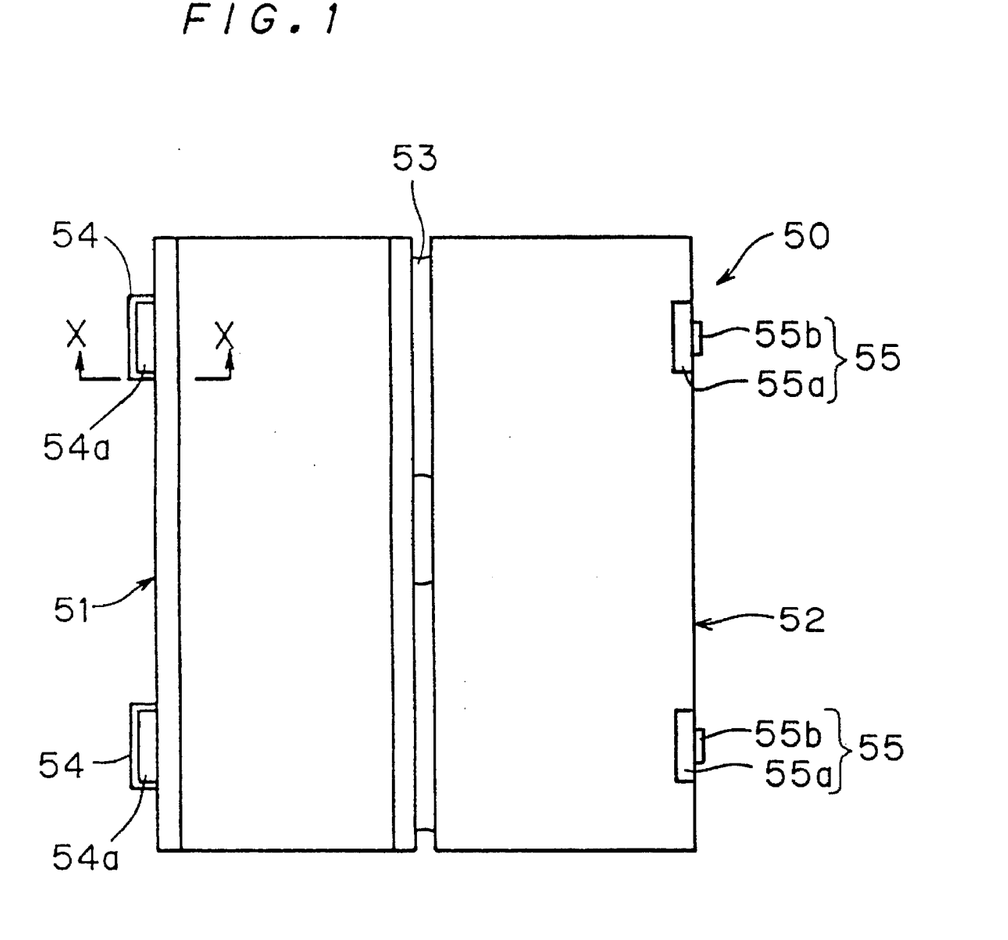
FIG. 1 is a plan view of a protector according to the present invention.

FIG. 1 illustrates a molded part of thermoplastic resin in the form of a protector 50 for an automotive wire harness according to the present invention.

Figure 2:
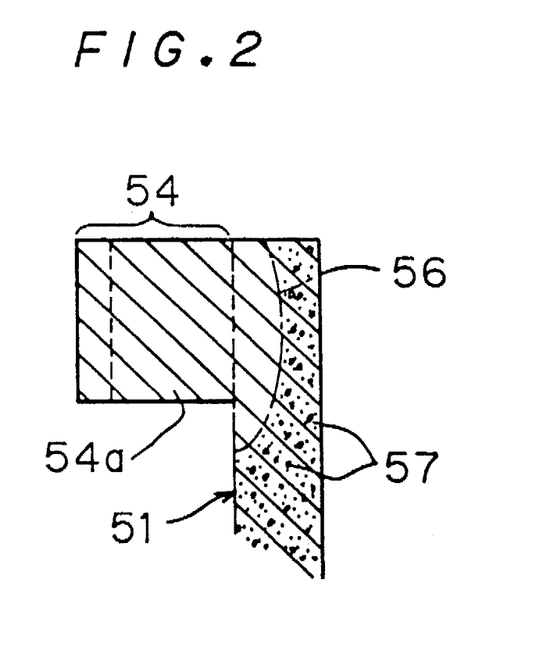
FIG. 2 is an enlarged sectional view taken along the line X—X of FIG. 1.

Similarly to the protector 100 of FIGS. 8A and 8B, the protector 50 comprises a protector body 51 of a U-shaped cross-sectional configuration, and a plate-like lid element 52 for closing an opening side surface of the protector body 51. The protector body 51 is coupled to the lid element 52 with a thin-walled hinge 53. Lock portions 54 are formed integrally with the protector body 51 at upper ends of one side surface of the protector body 51, and lock portions 55 are formed integrally with the lid element 52 on one side of the lid element 52. The lid element 52 is fixed in such a manner as to close the opening side surface of the protector body 51 by engagement of the lock portions 54 with the lock portions 55. Referring to FIG. 2, in the protector 50, the thermoplastic resin forming a selected area 56 including the lock portions 54 contains no foams, and the thermoplastic resin forming a non-selected area other than the selected area 56 contains foams 57 which are dispersed generally uniformly so as to provide a predetermined expansion ratio.

Each of the lock portions 54 of the protector body 51 has a through aperture 54a of a rectangular cross-sectional configuration extending vertically therethrough between the lock portion 54 and a side surface of the protector body 51. The lock portions 54 are elastically deformable so as to deform the through apertures 54a. Each of the lock portions 55 of the lid element 52 includes a projecting piece 55a projecting in a direction orthogonal to the surface of the lid element 52 and having a thickness generally equal to the width of the through aperture 54a, and an engaging projection 55b bulging outwardly from the outer surface of the projecting piece 55a.

When the lock portions 55 are fitted into the through apertures 54a of the lock portions 54, the engaging projections 55b pass through the through apertures 54a while deforming the through apertures 54a. The lock portions 54 are elastically recovered after the engaging projections 55b pass through the through apertures 54a. Consequently, the engaging projections 55b are locked by the lock portions 54 and are not capable of being withdrawn from the through apertures 54a. In this state, the lid element 52 closes the opening side surface of the protector body 51.

In the protector 50 as above constructed, the selected area 56 in the protector body 51 has a relatively high strength since no foams are present in the thermoplastic resin forming the selected area 56. The lock portions 54 included in the selected area 56 are not easily damaged by relatively large load applied thereto by the engagement with the engaging projections 55a of the lock portions 55 of the lid element 52. In the protector 50, the whole non-selected area other than the selected area 56 is formed of the thermoplastic resin containing the foams 57. The presence of the foams 57 allows the protector 50 to be lighter in weight than a protector of the same volume made of thermoplastic resin containing no foams. As described above, the protector 50 achieves weight reduction and the increased strength of the relatively greatly loaded lock portions 54.

Figure 3:
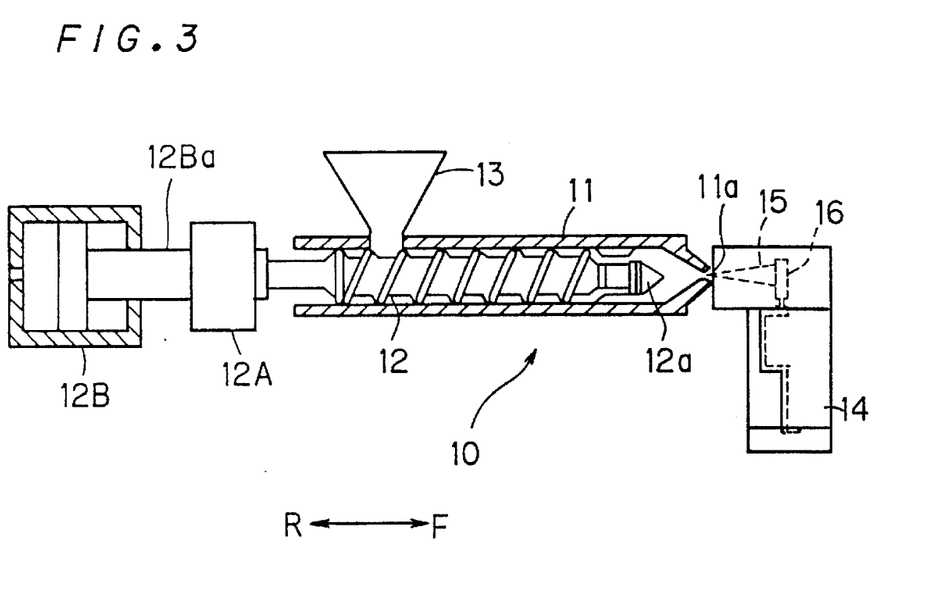
FIG. 3 is a schematic sectional view of an injection molding machine.

The above-mentioned protector 50 is fabricated in a manner to be described below by using an injection molding machine 10 shown in FIG. 3.

Figure 4:
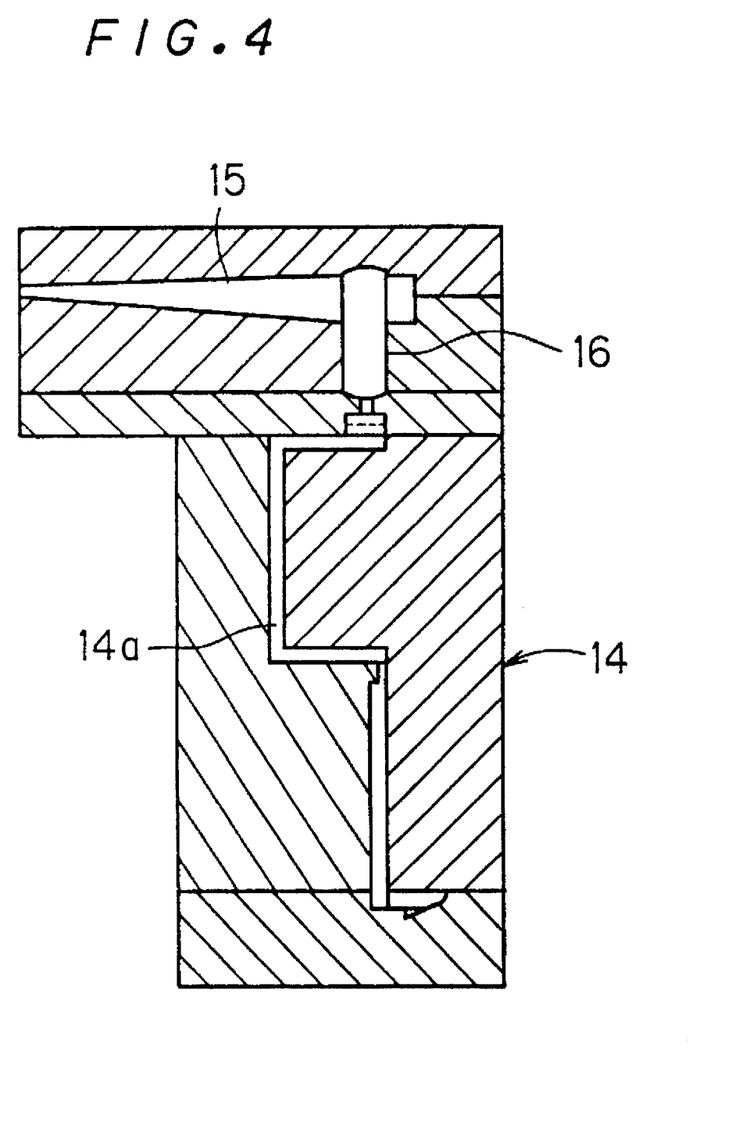
FIG. 4 is an enlarged sectional view illustrating a cavity of the injection molding machine.

The injection molding machine 10 shown in FIGS. 3 and 4 will now be described. The injection molding machine 10 comprises a cylinder 11, a screw 12, a hopper 13, a mold 14, a sprue 15, and a runner 16.

The cylinder 11 has a nozzle 11a at its front end.

The screw 12 is housed in the cylinder 11, with a screw head 12a thereof directed toward the nozzle 11a of the cylinder 11. The screw 12 is rotated by the drive power of a driving source 12A such as a motor. The driving source 12A rotates the screw 12 at a speed indicated by a controller not shown. The driving source 12A is movable in an axial direction of the screw 12 and is fixed to a piston rod 12Ba of an actuator 12B such as a hydraulic cylinder. The actuator 12B applies thrust to the screw 12 to move the screw 12 toward the nozzle 11a of the cylinder 11 (in the direction of the arrow F) and, when the screw 12 moves toward the driving source 12A (in the direction of the arrow R), applies back pressure against the movement. The actuator 12B can adjust the thrust and back pressure to any magnitude by the indication of the controller not shown.

The hopper 13 has a discharge opening connected to the rear end of the cylinder 11.

The mold 14 includes a plurality of divided molds. The divided molds are fastened together to define a cavity 14a of a predetermined configuration, i.e. the same configuration as the protector 50 herein, inside of the mold 14 (See FIG. 4).

Figure 5:
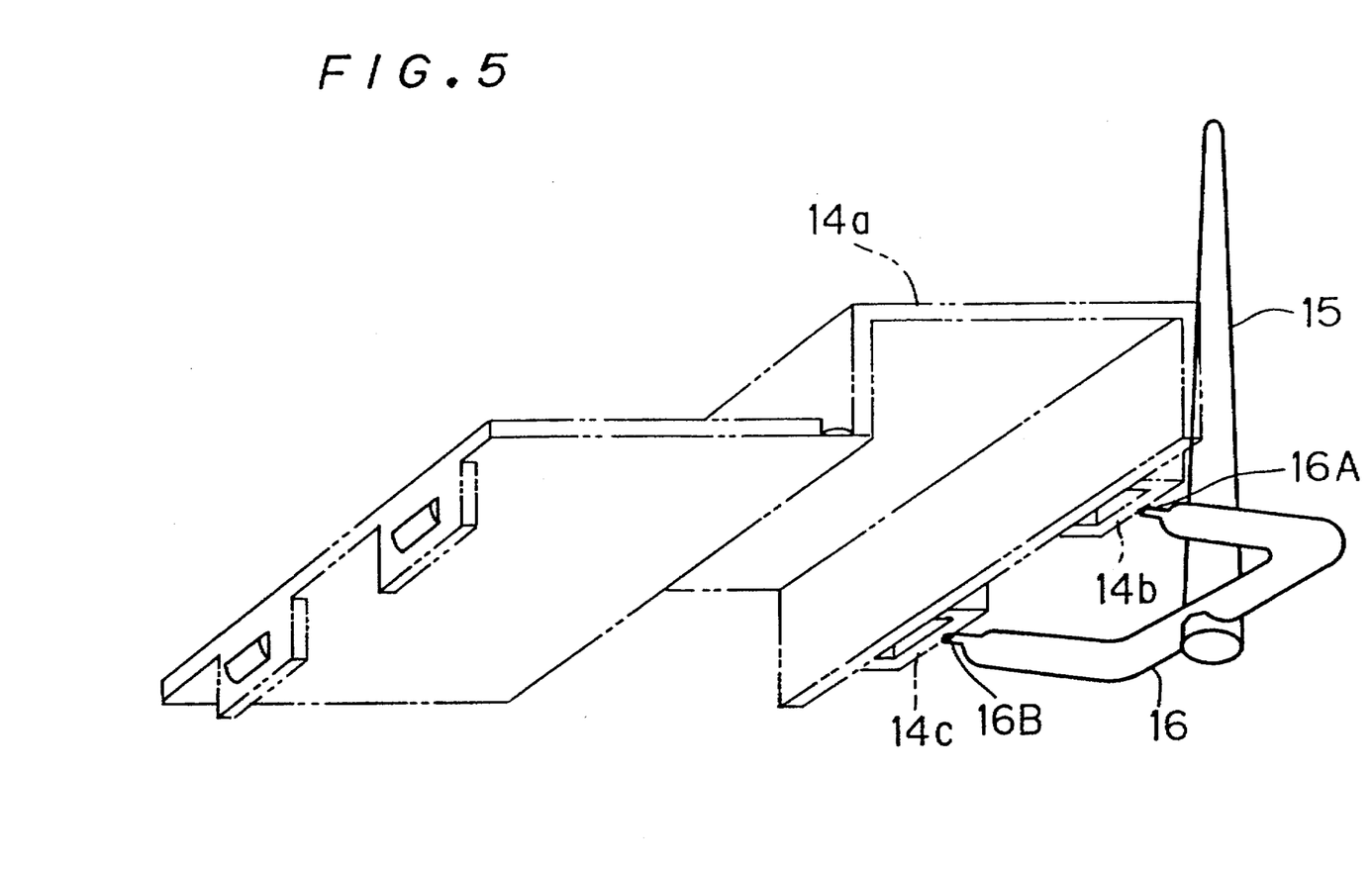
FIG. 5 is a perspective view of a sprue and a runner.

The sprue 15 is a tapered passage for coupling the nozzle 11a of the cylinder 11 to the runner 16 to be described later as shown in FIG. 5 and has a seat for fixing the nozzle 11a to a predetermined position at the small-diameter end thereof.

The runner 16 is branched from the large-diameter side of the sprue 15 toward two portions 14b and 14c of the cavity 14a which correspond to the lock portions. Injection gates 16A and 16B are formed at the front ends of the runner 16 and communicate with the portions 14b and 14c corresponding to the lock portions, respectively.

Using the injection molding machine 10 as above constructed, the protector 50 shown in FIG. 1 is fabricated through the following procedure.

Figure 6A:
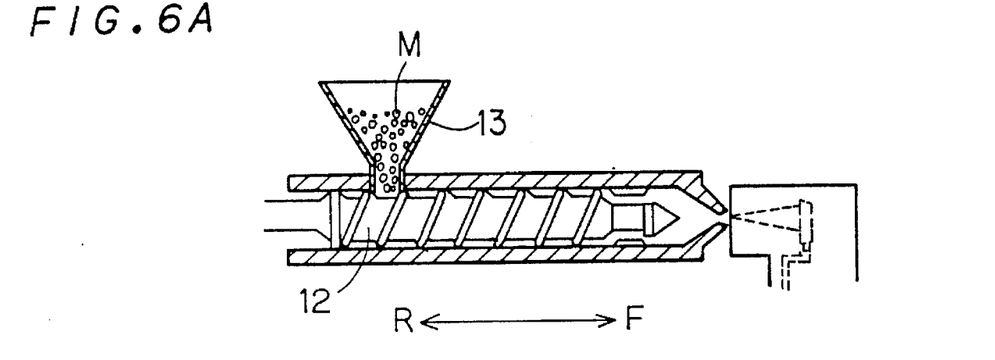
FIGS. 6A, 6B, and 6C illustrate fabrication processes of the protector.

Referring to FIG. 6A, a thermoplastic resin material and a foaming agent are fed into the hopper 13, with the screw 12 advancing to the forefront position (in the direction of the arrow F). The quantity ratio of the thermoplastic resin material to the foaming agent is appropriately determined so as to ensure the required strength of the foamed portion in the molded part of thermoplastic resin to be fabricated by this method.

Figure 6B:
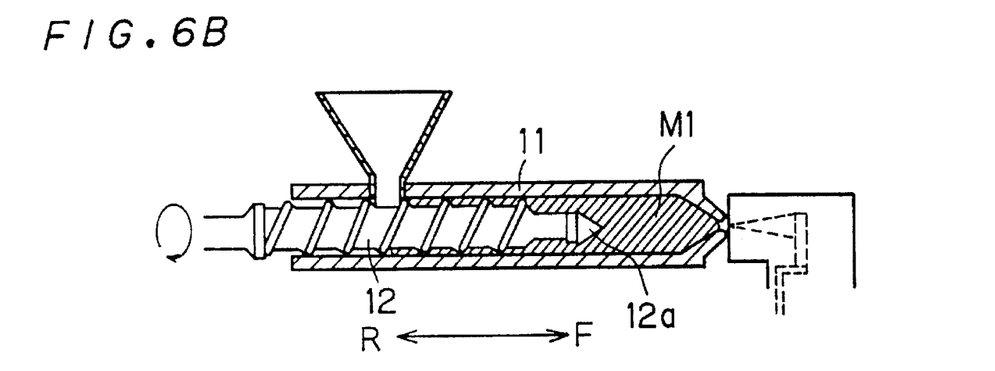

The driving source 12A is actuated, with the thermoplastic resin material and the foaming agent fed in the hopper 13, to rotate the screw 12 in the direction to retract the helical channel of the screw 12 at a rotational speed controlled in a manner to be described later. At that time, a predetermined back pressure greater than zero which is controlled in a manner to be described later is applied to the screw 12. The rotation of the screw 12 under such conditions permits the thermoplastic resin material and foaming agent in the hopper 13 to be fed into the cylinder 11. The thermoplastic resin material and foaming agent fed into the cylinder 11 are kneaded by the rotating screw 12 and plasticized into a molten resin M1. The molten resin M1 is transferred to the front of the screw head 12a along the helical channel of the screw 12 as shown in FIG. 6B. The screw 12 is retracted toward the actuator 12B (in the direction of the arrow R) by the pressure of the molten resin extruded into the front of the screw head 12a. The rotation of the screw 12 is interrupted when the screw 12 retracts a predetermined amount. That is, the operation of the driving source 12A is interrupted when a predetermined amount of molten resin is accumulated in the front of the head of the screw 12.

Figure 6C:
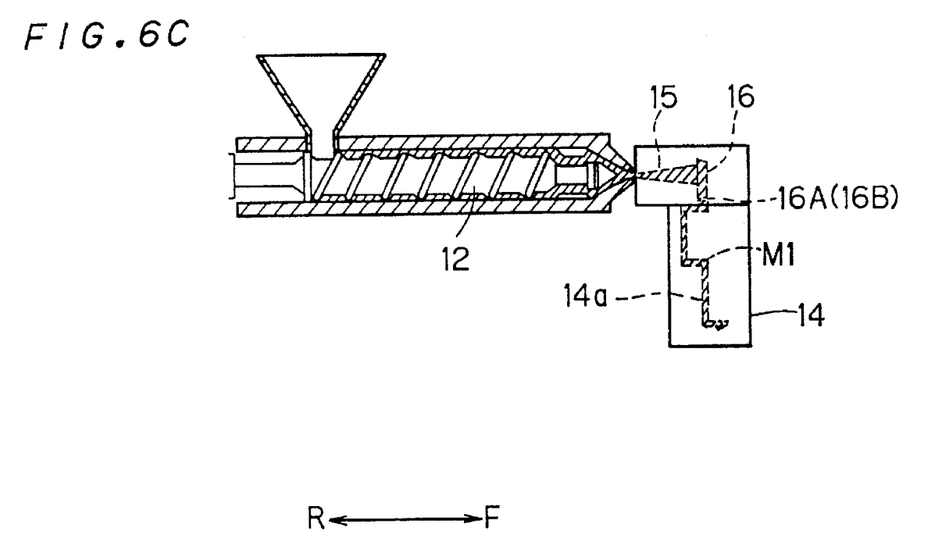

The actuator 12B is actuated, with the rotation of the screw 12 interrupted, to move the screw 12 forwardly (in the direction of the arrow F) at a predetermined speed. This permits the plasticized thermoplastic resin or the molten resin M1 accumulated in the front of the screw head 12a to be fed into the injection gates 16A, 16B through the sprue 15 and runner 16 and then into the cavity 14a of the mold 14, as shown in FIG. 6C. The predetermined amount of molten resin accumulated in the front of the screw head 12a is entirely injected into the cavity 14a, which is then filled with the plasticized thermoplastic resin.

The thermoplastic rein in the cavity 14a is cooled by cooling the mold 14. The mold 14 is then opened, and the molded part of thermoplastic resin or the protector 50 is provided which is of the predetermined configuration.

In the method of fabricating a molded part of thermoplastic resin described herein, the protector 50 is fabricated wherein the resin forming the selected area 56 contains no foams but the resin forming the other area contains foams. For this purpose, the rotational speed of the screw 12 and/or the back pressure against the screw 12 are controlled in the following manner in the step of plasticizing the thermoplastic resin. The control method will be described below.

Figure 7:
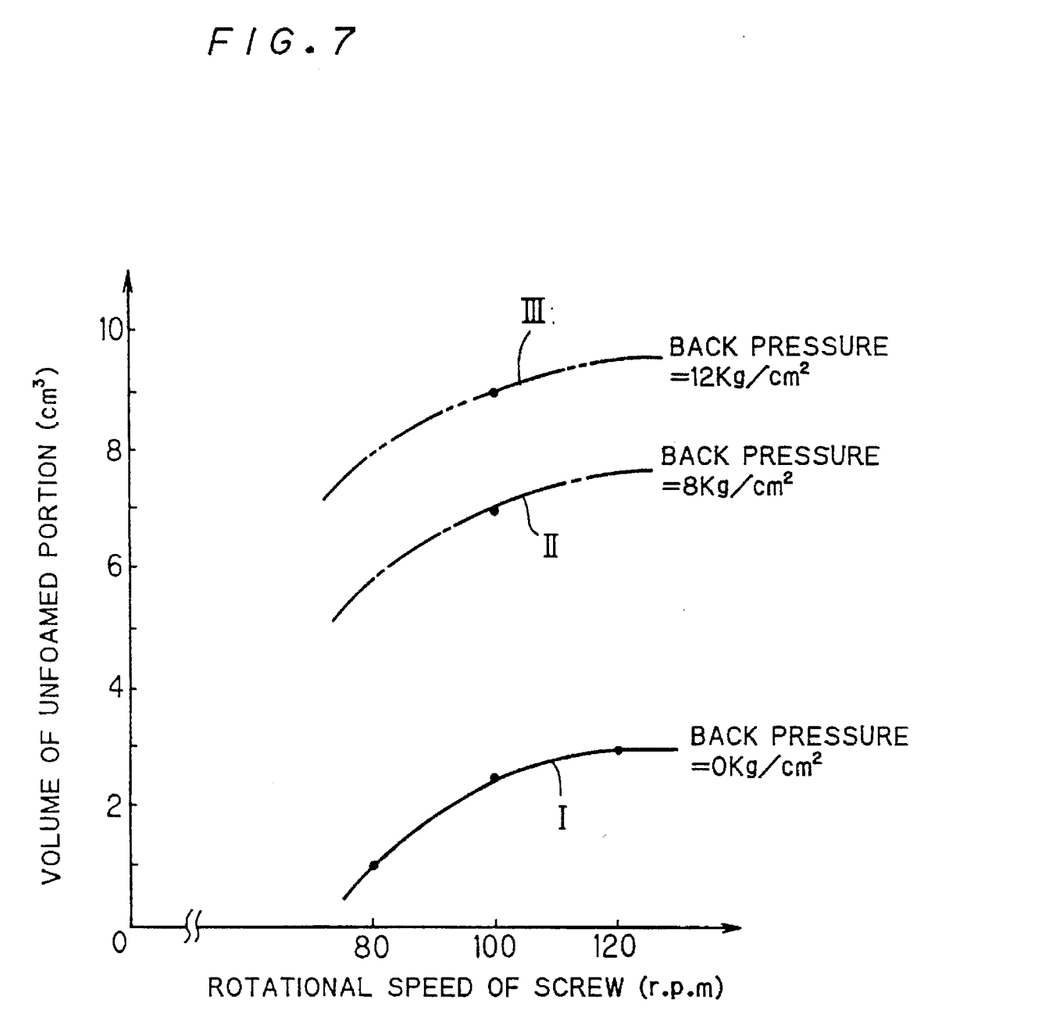
FIG. 7 is a graph showing relation between the rotational speed of a screw and the volume of an unfoamed portion.

The solid curve I of FIG. 7 shows experimental values of the volume of the unfoamed portion formed in portions of the molded part of thermoplastic resin which correspond to the outlets of the injection gates 16A, 16B versus the rotational speed of the screw 12 where the back pressure is zero. The curve I indicates that the volume of the unfoamed portion formed in the portions corresponding to the outlets of the injection gates 16A, 16B where the back pressure is zero is about 1 cm³ at 80 r.p.m. rotational speed of the screw 12, about 2.5 cm³ at 100 r.p.m., and about 3 cm³ at 120 r.p.m. This indicates that, if the volume of the lock portions 54 is less than 3 cm³, the 120 r.p.m. rotational speed of the screw 12 ensures that at least the selected area 56 of 3 cm³ in volume including the lock portions 54 is rendered unfoamed at the back pressure of zero.

As above described, the thermoplastic resin forming a strength-required area such as the lock portions 54 can be achieved in the form of unfoamed resin containing no foams by controlling only the rotational speed of the screw 12 in the step of plasticizing the thermoplastic resin.

For achieving the thermoplastic resin forming the strength-required area in the form of the unfoamed resin containing no foams, the back pressure may be controlled.

The dashed-and-dotted curve II and dashed-and-double-dotted curve III of FIG. 7 show experimental values of the volume of the unfoamed portion formed in portions of the molded part of thermoplastic resin which correspond to the outlets of the injection gates 16A, 16B versus the rotational speed of the screw 12 where the back pressure is 8 Kg/cm² and where the back pressure is 12 Kg/cm², respectively. It is apparent from FIG. 7 that, if the rotational speed of the screw 12 is fixed to 100 r.p.m., the volume of the unfoamed portion is about 3 cm³ at the back pressure of zero, about 7 cm³ at 8 Kg/cm² back pressure, and about 9 cm³ at 12 Kg/cm² back pressure. Thus, at 100 r.p.m. constant rotational speed of the screw 12, the back pressure is adjusted to 12 Kg/cm² for execution of the plasticizing step when the volume of the lock portions 54 is less than 9 cm³.

In the foregoing description, one of the back pressure and rotational speed is fixed while the other is controlled. It is, however, apparent from FIG. 7 that both of the back pressure and the rotational speed may be controlled simultaneously so that the volume of the unfoamed portion is a volume corresponding to the strength-required area. In the FIG. 7 case, for example, the back pressure is adjusted to 8 Kg/cm² and then the rotational speed is adjusted to 100 r.p.m. when the volume of the unfoamed portion is 7 cm³. When the volume of the unfoamed portion is 8.5 cm³, the back pressure is adjusted to 12 Kg/cm² and then the rotational speed is adjusted to 90 r.p.m.

As hereinabove described, control of the rotational speed of the screw and/or the back pressure in the step of plasticizing the thermoplastic resin provides the molded part fabricated such that no foams are present in the thermoplastic resin forming the strength-required area such as the lock portions 54 but foams are present in the thermoplastic resin forming the area other than the strength-required area.

It should be noted that the values on the abscissa and ordinate of the graph of FIG. 7 are inherent in a predetermined device, and the present invention is not limited to these values.

While the invention has been shown and described in detail, the foregoing description is in all aspects illustrative and not restrictive. It is therefore understood that numerous modifications and variations can be devised without departing from the scope of the invention.

What is claimed is:

1. A method of manufacturing a molded part of thermoplastic resin containing both foamed and unfoamed areas, said method comprising the steps of:

feeding a thermoplastic resin material and a foaming agent into a cylinder of an injection molding machine having a nozzle communicating with an injection gate;

rotating a screw disposed in said cylinder at a rotational speed sufficient to knead and plasticize said thermoplastic resin and said foaming agent in said cylinder;

injecting said plasticized thermoplastic resin from said injection gate into a cavity in a mold; and cooling said thermoplastic resin in said cavity and then removing said molded part of thermoplastic resin from said mold, said injection gate being coupled to a portion of said cavity corresponding to an area of said molded part requiring strength, said rotational speed of said screw being controlled such that the thermoplastic resin injected into said cavity is rendered unfoamed only in a region corresponding to the volume of said area requiring strength at an outlet of said injection gate and said thermoplastic resin injected into said cavity is foamed in areas not requiring strength.

2. A method of manufacturing a molded part of thermoplastic resin containing both foamed and unfoamed areas, said method comprising the steps of:

feeding a thermoplastic resin material and a foaming agent into a cylinder of an injection molding machine having a nozzle communicating with an injection gate;

rotating a screw disposed in said cylinder with a back pressure applied to said screw sufficient to knead and plasticize said thermoplastic resin and said foaming agent in said cylinder;

injecting said plasticized thermoplastic resin from said injection gate into a cavity in a mold; and cooling said thermoplastic resin in said cavity and then removing said molded part of thermoplastic resin from said mold, said injection gate being coupled to a portion of said cavity corresponding to an area of said molded part requiring strength, said back pressure being controlled such that the thermoplastic resin injected into said cavity is rendered unfoamed only in a region corresponding to the volume of said area requiring strength at an outlet of said injection gate and said thermoplastic resin injected into said cavity is foamed in areas not requiring strength.

* * * * *